Patented Dec. 25, 1951

2,580,023

UNITED STATES PATENT OFFICE 2,580,023

COATING COMPOSITION

Kurt Helmholtz, Flensburg, Germany; Margarete Kitti Helmholtz, administratrix of said Kurt Helmholtz, deceased, assignor to Goodcliff-Eecen Industries Pty. Limited, Sydney, Australia, a corporation of New South Wales, Australia No Drawing. Application May 11, 1950, Serial No. 161,469. In Germany May 23, 1949

12 Claims. (Cl. 260—738)

The present invention relates to coating compositions and especially to useful metal-containing coating materials and to a method of producing surface coating compositions containing heavy metals and particularly metallic lead powder.

It is known that in electrolytically plating steel or iron with lead in aqueous baths, the metallic lead does not well adhere to rivets, screw heads, or like projections, and if lead is deposited on such points at all it is only loosely bonded. It is further known that the application of a homogeneous lead coating by dipping in a bath of molten lead or by the hot-spraying method is often practically impossible on account of unfavorable construction, dimension, or location of the work or structure to be coated.

It is an object of the present invention to provide a metal-containing coating material comprising a low viscous compound of chlorinated artificial or natural rubber in organic solvents mixed with powder of heavy metals, for example, lead powder, of extremely fine particles. The particles of the metallic lead powder has preferably a size of less than about 0.003 of an inch (0.075 mm.). From the lead powder preferably 40 per cent should pass a screen of 10,000 meshes on a square centimeter. Other heavy metals such as copper may be admixed to the coating compositions according to this invention. The natural or artificial rubber is chlorinated to such a degree that the viscosity of a solution of 25 per cent in toluol is less than 40 seconds Saybolt, preferably to about 10 to 15 seconds Saybolt. According to a preferred embodiment of this invention to the solution of chlorinated rubber an unsaponifiable softener is added whose boiling point at a pressure of 15 mm. Hg (millimeters mercury) is above of about 150° C. Suitable softeners are substitution products of diphenyls or their derivatives, for example chlorination products as dichlor-diphenyls or products of higher chlorination steps. It is advisable to use a mixture of various diphenyl-chlorides and preferably such a mixture, having a specific gravity of about 1.6 at 25° C.

According to another embodiment of this invention a catalyst, for instance a metallic salt of the eighth group of the periodic system of elements, is added to the coating composition with the purpose of accelerating the oxidation of lead and of passivating the iron surface. Such a catalyst is, for instance, potassium osmiate, which is added in amounts of about 0.00025 to 0.0001 per cent of weight of the total amount of the coating material.

The following example is an illustration of the invention and is not intended as a limitation thereon.

26 kgs. of chlorinated india-rubber of the formula $(C_{10}H_{12}Cl_2)n$, which has been produced by chlorinating dead-milled pale crepe in a solution of carbon tetrachloride under agitation, are brought into a vessel. The depolymerisation of the rubber by chlorination is continued until a solution of 25 per cent in toluol has a viscosity of less than about 40 seconds Saybolt, preferably about 10 to 15 seconds Saybolt.

To the chlorinated rubber 16 kgs. diphenylchloride are added, which previously have been liquified by heating. Subsequently are added 28 kgs. solvent naphtha I, 16 kgs. solvent naphtha II, and 18 kgs. carbon tetrachloride and the mixture is thereupon vigorously agitated until complete solution is effected.

To this solution 1 gram of potassium osmiate $(K_2OSO_4,2H_2O)$ as catalyst is added, whereupon 396 kgs. lead powder are admixed and the mixture is agitated until a homogeneous mass has been achieved.

The coating composition prepared in this manner is ready for use and may be applied to surfaces of steel, iron, wood and of other materials by hand-brushing or spraying.

Instead of chlorinated natural rubber, other chlorination products of synthetic polydiolefins, such as chlorination products of butadiene or other artificial rubber substances as 2-chlorine butadiene (neoprene) or their polymerisation products may be used.

Diphenyl-chlorine, for the purpose of this invention, is produced according to known methods and dichlor-diphenyls, trichlor-diphenyls, tetrachlorine-diphenyls, pentachlorine diphenyls, hexachlorine diphenyls, or decachlorine diphenyl may serve as basis. It has been found that a mixture of different chlorinated diphenyls having a viscosity of about 46.0 to 47.7 seconds Saybolt at a temperature of 210° F. and a specific gravity of 1.543 to 1.550 at 25° C. is especially suitable. Such a mixture at room temperature represents a light yellow soft sticky clear resin and is known under the trade name Aroclor 1254 as manufactured by the Monsanto Chemical Company of St. Louis, Missouri, U. S. A.

Instead of potassium osmiate also other catalysts as osmium cloride $(OsCL_2)$ or corresponding compounds of ruthenium, rhodium, iridium, platinum or palladium, may be added to obtain similar results.

The powder of heavy metals such as lead, copper, zinc, chromium or tin, or mixtures thereof, must be of such a fine size that the particles pass through a screen having a wire mesh of 6400 meshes per cm.² and a wire diameter of 0.050 mm. The finer the metal powder, the better it is kept in suspension in the composition, rendering the coating composition brush- and spray-ready for long periods without subsequent agitation. Besides, sufficient small metallic particles render a more homogeneous protective surface coating and a denser metallic film.

A catalyst of a metal of the platinum group against heavy metals, as lead, copper, zinc, chromium or tin has an positive electrolytic action, effecting that these metals are partly converted into oxides, hydroxides and carbonates, resulting in a thin protective film of oxides or the like enveloping each particle of the metal. Against iron, however, such catalysts of the platinum group have passivating galvanic action, effecting a protection of the iron surface against the formation of rust. The catalysts enter into action through aliphatic and aromatic combinations of the solvent liquid in which the metal powder is suspended.

After application of the composition to a surface, the volatile organic solvents evaporate and it remains as protective film resembling a layer of lead. The binding composition chemically is extremely resistant and mechanically of high solidity and toughness, and thereby, nevertheless, elastic thus cracks and ruptures in the film are avoided and rendering it resistant against atmospheric and sea water affection. The coating film in dry condition contains about 92 per cent of weight of metallic lead.

The metal-containing coating composition according to the present invention may be applied wherever lead coating by the bath immersion or hot-spraying is practically impossible or where no satisfactory results may be obtained. The present coating may well replace other protective coverings and serve as under-coating and just as well as top or finish coating. It renders unnecessary to under-coat the surfaces with red lead, which is conventionally applied on steel construction works. Furthermore, the present coating material is suitable for applying to surfaces of any material and it offers protective covering for structures of steel and other heavy metals as well as of masonry, concrete and wood. The latter, however, must be in a dry state.

On application of the material to a surface and after drying, a buffable and polishable layer is obtained, appearing after polishing like a metal surface, for instance, a metallic lead surface, hardly distinguishable from a surface which has been covered by known lead-plating processes. The lead layer produced after evaporation of the volatile solvents resembles pure lead closely and an unalterable and not aging lead covering is obtained protecting the structure or work to which the material has been applied to. Thus, a valuable, resistant, and corrosionproof substitute of previously applied protective surface coverings is created according to this invention which surpasses conventional surface protective means in its convenient applicability, its low cost, its durability, and its effectiveness.

I claim:

1. A coating composition comprising about 5 parts by weight of a chlorinated derivative of a material selected from the class consisting of rubber, and synthetic chlorinated polydiolefins, chlorinated to such a degree that the viscosity of a 25% solution in toluol is less than 40 seconds Saybolt, about 15 parts by weight of an organic solvent for the chlorinated rubber, about 80 parts by weight of a heavy metal powder selected from the class of metals consisting of lead, copper, zinc, chromium, cobalt, nickel and tin, and a catalyst functioning as an oxidation catalyst for the heavy metal powder and as a corrosion inhibitor when the coating composition is applied to a ferrous metal surface selected from the group consisting of the chlorides of osmium, ruthenium, rhodium, iridium, platinum and paladium and potassium osmiate, potassium rutheniate, potassium rhodiate, potassium iridiate, potassium platinate and potassium paladate, said catalyst in amounts of about 0.00025 to 0.0001 parts by weight of the total composition.

2. A coating composition comprising about 5 parts by weight of chlorinated rubber, chlorinated to such a degree that the viscosity of a 25% solution in toluol is less than 40 seconds Saybolt, about 13 parts by weight of an organic solvent for the chlorinated rubber, about 2 parts by weight of an unsaponifiable softener the boiling point of which is higher than about 150° C. at a pressure of 15 mm. mercury, about 80 parts by weight of lead powder, and about 0.00025 to 0.0001 parts by weight of osmium chloride, which acts as an oxidation catalyst for the lead powder and which has a passivating action against iron.

3. A coating composition comprising about 5 parts by weight of chlorinated rubber, chlorinated to such a degree that the viscosity of a 25% solution in toluol is less than 40 seconds Saybolt, about 15 parts by weight of an organic solvent for the chlorinated rubber, about 80 parts by weight of lead powder having a particle size less than 0.075 mm. in diameter, and about 0.00025 to 0.0001 parts by weight of potassium osmiate.

4. A coating composition comprising about 5 parts by weight of chlorinated rubber, chlorinated to such a degree that the viscosity of a 25% solution in toluol is less than 40 seconds Saybolt, about 13 parts by weight of an organic solvent for the chlorinated rubber, about 2 parts by weight of a chlorinated diphenyl as plasticizer, about 80 parts by weight of lead powder, and about 0.00025 to 0.0001 parts by weight of potassium osmiate.

5. A coating composition comprising about 5 parts by weight of chlorinated rubber, chlorinated to such a degree that the viscosity of a 25% solution in toluol is less than 40 seconds Saybolt, about 15 parts by weight of an organic solvent for the chlorinated rubber, about 80 parts by weight of lead powder having a particle size less than 0.075 mm. in diameter, and about 0.00025 to 0.0001 parts by weight of osmium chloride.

6. A coating composition comprising about 5 parts by weight of chlorinated rubber, chlorinated to such a degree that the viscosity of a 25% solution in toluol is less than 40 seconds Saybolt, about 13 parts by weight of an organic solvent for the chlorinated rubber, about 2 parts by weight of a chlorinated diphenyl as plasticizer, about 82–63 parts by weight of lead powder, and about 0.00025 to 0.0001 parts by weight of osmium chloride.

7. A coating composition comprising about 5 parts by weight of a material selected from the class consisting of chlorinated rubber and synthetic chlorinated polydiolefins, chlorinated to such a degree that the viscosity of a 25% solution in toluol is less than 40 seconds Saybolt, about 15 parts by weight of an organic solvent for the chlorinated material, about 80 parts by weight of lead powder, and about 0.00025 to 0.0001 parts by weight of potassium osmiate.

8. A coating composition comprising about 5 parts by weight of a material selected from the class consisting of chlorinated rubber and synthetic chlorinated polydiolefins, chlorinated to such a degree that the viscosity of a 25% solution in toluol is less than 40 seconds Saybolt, about 15 parts by weight of an organic solvent for the chlorinated material, about 80 parts by weight of lead powder, and about 0.00025 to 0.0001 parts by weight of osmium chloride.

9. A coating composition comprising about 5 parts by weight of chlorinated rubber, chlorinated to such a degree that the viscosity of a 25% solution in toluol is less than 40 seconds Saybolt, about 15 parts by weight of an organic solvent for the chlorinated rubber about 80 parts by weight of a heavy metal powder selected from the group consisting of lead, copper, zinc, chromium, cobalt, nickel, and tin, and about 0.00025 to 0.0001 parts by weight of potassium osmiate.

10. A coating composition comprising about 5 parts by weight of chlorinated rubber, chlorinated to such a degree that the viscosity of a 25% solution in toluol is less than 40 seconds Saybolt, about 15 parts by weight of an organic solvent for the chlorinated rubber about 80 parts by weight of a heavy metal powder selected from the group consisting of lead, copper, zinc, chromium, cobalt, nickel, and tin, and about 0.00025 to 0.0001 parts by weight of osmium chloride.

11. A coating composition consisting of about 5 parts to 23 parts of chlorinated rubber, chlorinated to such a degree that the viscosity of a 25% solution in toluene is less than 40 seconds Saybolt, about 13 parts by weight of an organic solvent for the chlorinated rubber, about 2 parts by weight of a chlorinated diphenyl as plasticizer, about 82 to 63 parts of lead powder having a particle size less than 0.075 mm. in diameter, and about 0.00025 to 0.0001 parts by weight of osmium chloride.

12. A coating composition consisting of about 5 parts to 23 parts of chlorinated rubber, chlorinated to such a degree that the viscosity of a 25% solution in toluene is less than 40 seconds Saybolt, about 13 parts by weight of an organic solvent for the chlorinated rubber, about 2 parts by weight of a chlorinated diphenyl as plasticizer, about 82 to 63 parts of lead powder having a particle size less than 0.075 mm. in diameter, and about 0.00025 to 0.0001 parts by weight of potassium osmiate.

KURT HELMHOLTZ.

REFERENCES CITED

The following references are of record in the file of this patent:

UNITED STATES PATENTS

| Number | Name | Date |
|---|---|---|
| 2,057,442 | Mix | Oct. 13, 1936 |
| 2,088,140 | Rosenthal et al. | July 27, 1937 |
| 2,115,055 | Einkelmann | Apr. 26, 1938 |
| 2,225,303 | Gliff et al. | Dec. 17, 1940 |
| 2,231,370 | Reid | Feb. 11, 1941 |